(12) United States Patent  (10) Patent No.: US 8,243,225 B2
Kai et al.  (45) Date of Patent: Aug. 14, 2012

(54) ELECTRONIC DEVICE HAVING PROTECTION PANEL

(75) Inventors: Yoshihiro Kai, Nagaokakyo (JP); Kazuhiro Nishikawa, Uji (JP); Yuichiro Takai, Kyoto (JP)

(73) Assignee: Nissha Printing Co., Ltd., Kyoto (JP)

( * ) Notice: Subject to any disclaimer, the term of this patent is extended or adjusted under 35 U.S.C. 154(b) by 164 days.

(21) Appl. No.: 12/810,177

(22) PCT Filed: Dec. 22, 2008

(86) PCT No.: PCT/JP2008/073297
§ 371 (c)(1),
(2), (4) Date: Sep. 27, 2010

(87) PCT Pub. No.: WO2009/084502
PCT Pub. Date: Jul. 9, 2009

(65) Prior Publication Data
US 2011/0026202 A1 Feb. 3, 2011

(30) Foreign Application Priority Data
Dec. 27, 2007 (JP) ................................. 2007-338265

(51) Int. Cl.
*G02F 1/1333* (2006.01)
*G02F 1/1335* (2006.01)

(52) U.S. Cl. ................................ 349/58; 349/12; 349/60

(58) Field of Classification Search ........................ None
See application file for complete search history.

(56) References Cited

U.S. PATENT DOCUMENTS

| 4,763,534 | A | * | 8/1988 | Hager ........................ 73/862.68 |
| 4,794,366 | A | | 12/1988 | Sakamoto |
| 5,541,570 | A | | 7/1996 | McDowell |
| 5,989,700 | A | | 11/1999 | Krivopal |
| 7,920,225 | B2 | * | 4/2011 | Nishikawa et al. ............. 349/60 |
| 8,077,264 | B2 | * | 12/2011 | Nishikawa et al. ............. 349/12 |
| 2001/0015423 | A1 | | 8/2001 | Ueda et al. |

(Continued)

FOREIGN PATENT DOCUMENTS
EP 1116754 A2 7/2001

(Continued)

OTHER PUBLICATIONS

Droste et al., "The Glass Transition Temperature of Filled Polymers and Its Effect on Their Physical Properties", Journal of Applied Polymer Science, 1969, pp. 2149-2168, vol. 13.

*Primary Examiner* — Rhonda Peace
(74) *Attorney, Agent, or Firm* — The Webb Law Firm

(57) ABSTRACT

An electronic device having a protection panel includes: a display device (3) having a display part (3A); a housing (2) for mounting the display device (3) therein which has a display window (2A) including an opening for allowing the display part (3A) to face externally and a supporting portion (2b) in a shape of a frame; a protection panel (4) fitted into the display window (2A), whose back side rim portion is supported by the supporting portion (2b); and a pressure-sensitive conductive print layer (30) which is disposed between the protection panel (4) and the supporting portion (2b) and configured to detect a pressing operation on the protection panel (4), and includes a resin having a glass-transition temperature (Tg) in a temperature range higher than room temperature as binder, and a conductive material dispersed therein.

8 Claims, 8 Drawing Sheets

U.S. PATENT DOCUMENTS

| | | |
|---|---|---|
| 2004/0156168 A1* | 8/2004 | LeVasseur et al. ............. 361/681 |
| 2005/0052428 A1* | 3/2005 | Hayashi et al. ............... 345/173 |
| 2005/0145045 A1 | 7/2005 | Papakostas et al. |
| 2006/0147700 A1 | 7/2006 | Papakostas et al. |
| 2007/0181456 A1* | 8/2007 | Kusuda et al. ................. 206/443 |
| 2008/0246741 A1* | 10/2008 | Hinata .......................... 345/173 |
| 2010/0053854 A1 | 3/2010 | Nishikawa et al. |

FOREIGN PATENT DOCUMENTS

| | | |
|---|---|---|
| JP | 62116230 A | 5/1987 |
| JP | 8138485 A | 5/1996 |
| JP | 8273471 A | 10/1996 |
| JP | 917276 A | 1/1997 |
| WO | 2007091600 A1 | 8/2007 |

* cited by examiner (a)

(b)

ELECTRONIC DEVICE HAVING PROTECTION PANEL

TECHNICAL FIELD

The present invention relates to an electronic device having a protection panel in which: a housing mounting a display device therein has a display window for allowing a display part of the display device to face externally, the display window is provided with a supporting portion for supporting the protection panel for the display device, and the protection panel is fitted into the display window.

BACKGROUND ART

For the conventional electronic device having a protection panel as described above, there can be mentioned an electronic device in which: a recess is formed in a front casing where a display unit is mounted inside; in a bottom face of the recess, an opening for allowing a display part of the display unit to face externally is formed; and a protection panel for the display unit is fitted into the recess in such a manner that a rim portion of the protection panel is directly supported by a rim of the bottom face of the recess.

Recent mobile-phones and smartphones, as examples of the electronic device having a protection panel, are provided with e-mail function and internet function in addition to the basic telephone function, and further with camera function and music player function. In this manner, there is a tendency that multifunctionality is imparted to the electronic devices. In order to realize the multifunctionality while preventing a growth in size of the electronic device, it is necessary to reduce a number of switches to be added, by allowing the switches provided for exerting the basic function to serve for other functions.

However, when a degree of serving for other functions becomes too large, the number of roles assigned to each switch becomes too large, leading to decrease in operability. In addition, the number of switches for exerting the basic function and the number of switches to be newly added have limitation. Therefore, to further increase the number of the functionality of the electronic device requires the growth in size of the electronic device.

Accordingly, as described in Patent Document 1, it has been proposed that, by efficiently utilizing the protection panel intrinsically provided in the electronic device having protection panel, the number of the functionality of the electronic device is further increased while preventing and suppressing the growth in size and decrease in operability of the electronic device, or alternatively, the operability is enhanced while preventing and suppressing the growth in size of the electronic device.

An electronic device 10 having the protection panel disclosed in Patent Document 1 includes: a display device 3 having a single display part 3A; a housing 2 for mounting the display device 3 therein which has a display window 2A including an opening to allow the display part 3A to face externally and a supporting portion 2b in a shape of a frame; the protection panel 104 fitted into the display window 2A, whose back side rim portion 104A is supported by the supporting portion 2b; and a pressure-sensitive conductive rubber 14 which is disposed between the protection panel 104 and the supporting portion 2b and configured to detect a pressing operation on the protection panel 104 (see FIG. 18). FIG. 18 is a cross sectional view taken along a line A-A of the mobile-phone in FIG. 17.

According to the above-described configuration, a pressure sensor can be obtained in which the protection panel 104 serves as an operation part, and the pressure-sensitive conductive rubber 14 serves as a sensor element. Therefore, the pressure sensor can be used as a switch corresponding to the function newly added to the electronic device, or as a switch to which a role is assigned that is otherwise played by the existing switch.

If the pressure sensor utilizing the protection panel 104 is used as, for example, a switch corresponding to the function newly added to the electronic device, a space for arranging a special-purpose switch dedicated to a new function becomes unnecessary that is otherwise required for newly introducing the special-purpose switch, or alternatively, an assignment of the role corresponding to the new function to the existing switch, that is required for allowing the existing switch to serve as a switch for new function, can be reduced. As a result, the multifunctionality of the electronic device can be realized while preventing or suppressing the growth in size of the electronic device which may otherwise be caused by securing the space for arranging the special-purpose switch, and preventing or suppressing the decrease in operability which may otherwise be caused by allowing the existing switch to serve as a switch for new function.

In addition, if the pressure sensor utilizing the protection panel 104 is used as, for example, a switch to which a role is assigned that is otherwise played by the existing switch, the space for arranging the special-purpose switch, to which a role is assigned that is played by the existing switch, becomes unnecessary that is otherwise required for newly introducing the special-purpose switch. As a result, operability can be enhanced while preventing and suppressing the growth in size of the electronic device that would otherwise occur by securing the space for arranging the switch.

Patent Document 1: WO2007/091600

DISCLOSURE OF THE INVENTION

Though the technique described in Patent Document 1 prevents and suppresses the growth in size of the electronic device, the size means that of a plane area. From the viewpoint of thickness, as shown in FIG. 18, the electronic device becomes larger by the amount corresponding to the thick pressure-sensitive conductive rubber 14 disposed between the protection panel 104 and the supporting portion 2b of the housing 2. Therefore, it is difficult to apply the technique described in Patent Document 1 to a product in which thinness is demanded, such as mobile device.

In addition, in the case of the electronic device having protection panel described in Patent Document 1, when used in a high-temperature environment, the pressure-sensitive conductive rubber 14 disposed between the protection panel 104 and the supporting portion 2b of the housing 2 expands, and as a result, a problem of failures occurs, such as reduction in the sensitivity and poor connection with the electrode.

The purpose of the present invention is to efficiently utilize the protection panel intrinsically provided in the electronic device having protection panel, in such a manner that the multifunctionality and enhancement of operability of the electronic device are realized while preventing and suppressing the growth in size and decrease in operability of the electronic device, and that thinness is maintained, and that a durability in a high-temperature environment is provided.

For this purpose, in a first aspect of the electronic device having a protection panel according to the present invention, it includes: a display device having a display part; a housing which is configured to mount the display device therein and have a display window including an opening to allow the display part to face externally, and a supporting portion in a shape of a frame; a protection panel fitted into the display window, whose back side rim portion is supported by the supporting portion; and a pressure-sensitive conductive print layer which is disposed between the protection panel and the supporting portion and configured to detect a pressing operation on the protection panel, and includes a resin having a glass-transition temperature (Tg) in a temperature range higher than room temperature as binder; and a conductive material dispersed therein.

According to the feature described above, a pressure sensor can be obtained in which the protection panel serves as an operation part, and the pressure-sensitive conductive rubber serves as a sensor element. Therefore, the pressure sensor can be used as a switch corresponding to the function newly added to the electronic device, or as a switch to which a role is assigned that is otherwise played by the existing switch.

If the pressure sensor utilizing the protection panel is used as, for example, a switch corresponding to the function newly added to the electronic device, a space for arranging a special-purpose switch dedicated to a new function becomes unnecessary that is otherwise required for newly introducing the special-purpose switch, or alternatively, an assignment of the role corresponding to the new function to the existing switch, that is required for allowing the existing switch to serve as a switch for new function, can be reduced. As a result, the multifunctionality of the electronic device can be realized while preventing or suppressing the growth in size of the electronic device which may otherwise be caused by securing the space for arranging the special-purpose switch, and preventing or suppressing the decrease in operability which may otherwise be caused by allowing the existing switch to serve as a switch for new function.

In addition, if the pressure sensor utilizing the protection panel is used as, for example, a switch to which a role is assigned that is otherwise played by the existing switch, the space for arranging a special-purpose switch, to which a role is assigned that is played by the existing switch, becomes unnecessary that is otherwise required for newly introducing the special-purpose switch. As a result, the operability can be enhanced while preventing and suppressing the growth in size of the electronic device that would otherwise occur by securing the space for arranging the switch.

Moreover, since the pressure-sensitive conductive print layer is used as a sensor element, as compared with the conventional relatively thick pressure-sensitive conductive rubber disposed between the protection panel and the supporting portion of the housing, the thinness of the electronic device can be retained, and the pressure-sensitive conductive print layer can be applied to a product in which thinness is demanded, such as mobile device.

In a second aspect of the electronic device having a protection panel according to the present invention, the pressure-sensitive conductive print layer is a thin film including: a vinyl chloride-vinyl acetate copolymer resin or acrylic resin as a binder; and the conductive material dispersed therein.

According to the feature described above, even when the electronic device having a protection panel is used in a high-temperature environment, the pressure-sensitive conductive print layer does not expand, and as a result, the problem of failures, such as reduction in the sensitivity and poor connection with the electrode, does not occur.

In a third aspect of the electronic device having a protection panel according to the present invention, a transparent resin film having the pressure-sensitive conductive print layer formed thereon is attached to a back side of the protection panel.

According to the feature described above, the pressure-sensitive conductive print layer can be formed on the transparent resin film using a regular printing method, such as screen printing, offset printing, gravure printing, and flexographic printing, and then the transparent film can be attached to a back side of the protection panel. Therefore, when the pressure-sensitive conductive print layer is formed on the transparent resin film, a printing method suitable for mass production, such as roll-to-roll processing (R to R), can be selected.

In a fourth aspect of the electronic device having a protection panel according to the present invention, the pressure-sensitive conductive print layer is formed in a shape of a loop along the supporting portion.

According to the feature described above, when a pressing operation is performed on the protection panel 4, a pressure on the protection panel 4 is applied to the pressure-sensitive conductive print layer 30 regardless of the position of the pressing operation, and the pressure-sensitive conductive print layer 30 becomes conductive. Therefore, the pressing operation on the protection panel 4 becomes stable and can be reliably detected.

In a fifth aspect of the electronic device having a protection panel according to the present invention, the pressure-sensitive conductive print layer is formed in at least one portion of the supporting portion.

According to the feature described above, in the back side rim portion of the protection panel, the pressure-sensitive conductive print layer may be located at four sides or four corners, to thereby provide the protection panel 4 with a function of a cross-shaped switch. In addition, in the case where the pressure sensitive function is required only in a portion of the operation part, e.g., in the case of icon, slider or the like, the pressure-sensitive conductive print layer may be disposed on the back side rim portion of the protection panel, only in an area where the pressure sensitive function is required.

In a sixth aspect of the electronic device having a protection panel according to the present invention, a pair of comb-like electrodes are disposed on one face of the pressure-sensitive conductive print layer, and the pair of comb-like electrodes is configured to detect a pressing operation on the protection panel.

According to the feature described above, by using a pair of comb-like electrodes, a contact area between the electrodes and the pressure-sensitive conductive print layer becomes large, and the adjustment of the sensitivity can be facilitated.

In a seventh aspect of the electronic device having a protection panel according to the present invention, a pair of spiral electrodes are disposed on one face of the pressure-sensitive conductive print layer, and the pair of spiral electrodes is configured to detect a pressing operation on the protection panel.

According to the feature described above, by using the spiral electrodes, the contact area between the electrodes and the pressure-sensitive conductive print layer becomes larger, and the adjustment of the sensitivity can be further facilitated.

In an eighth aspect of the electronic device having a protection panel according to the present invention, the protection panel is configured to function as a touch panel.

According to the feature described above, there can be obtained a pressure sensor with a touch panel function utilizing the protection panel for detecting the pressing operation on the protection panel and the pressing operation position on the protection panel, and a combination of pressure information and position information enables the pressure sensor to be used as a multifunctional switch that plays various complicated roles, or as a tablet with a pen pressure sensitive function. With this configuration, it becomes possible to provide the electronic device with further multifunctionality while preventing the growth in size and decrease in operability of the electronic device, and to make the device compact while preventing decrease in operability of the electronic device.

BEST MODE FOR CARRYING OUT THE INVENTION

A first embodiment of the present invention will be described below with reference to the drawings.

Examples of an electronic device having a protection panel according to the present invention include mobile devices, such as mobile-phone, smartphone, PDA, car navigation equipment, digital camera, digital video camera, and game device. Herein, descriptions will be made while the electronic device is illustrated as a mobile-phone 1.

Figure 17:
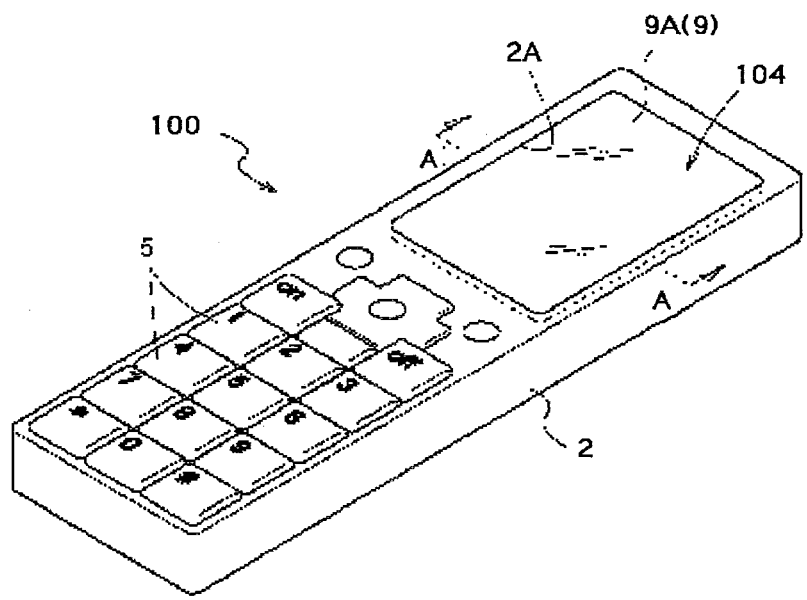
FIG. 17 is a perspective view of a mobile-phone.
Figure 18:
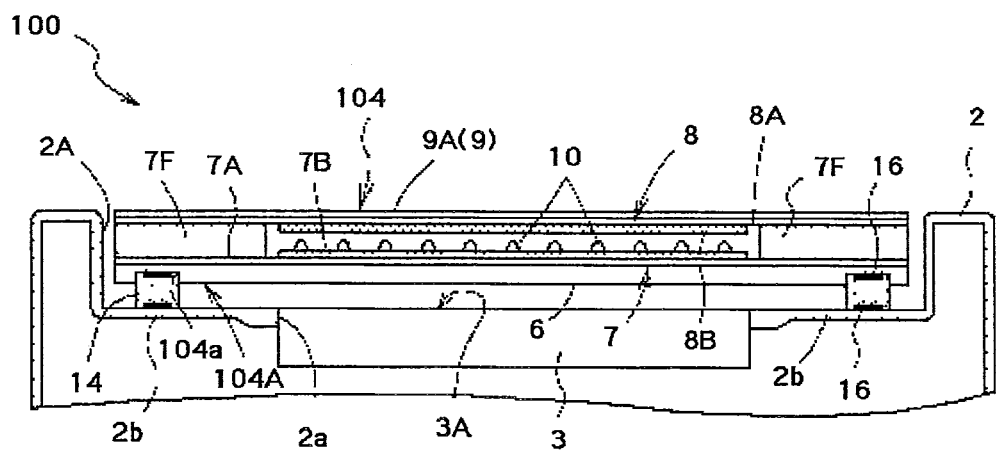
FIG. 18 is a transverse cross sectional view showing a relevant portion of one example of an electronic device having a protection panel of the prior art.

Like the conventional techniques, the mobile-phone 1 as one example of the electronic device having the protection panel includes: a housing 2 made of a synthetic resin whose front face has a display window 2A formed therein; a display device 3 having a display part 3A, such as crystalline liquid and organic EL; a protection panel 4 for protecting a surface of the display device 3; input keys 5; and the like (see FIG. 17).

Figure 1:
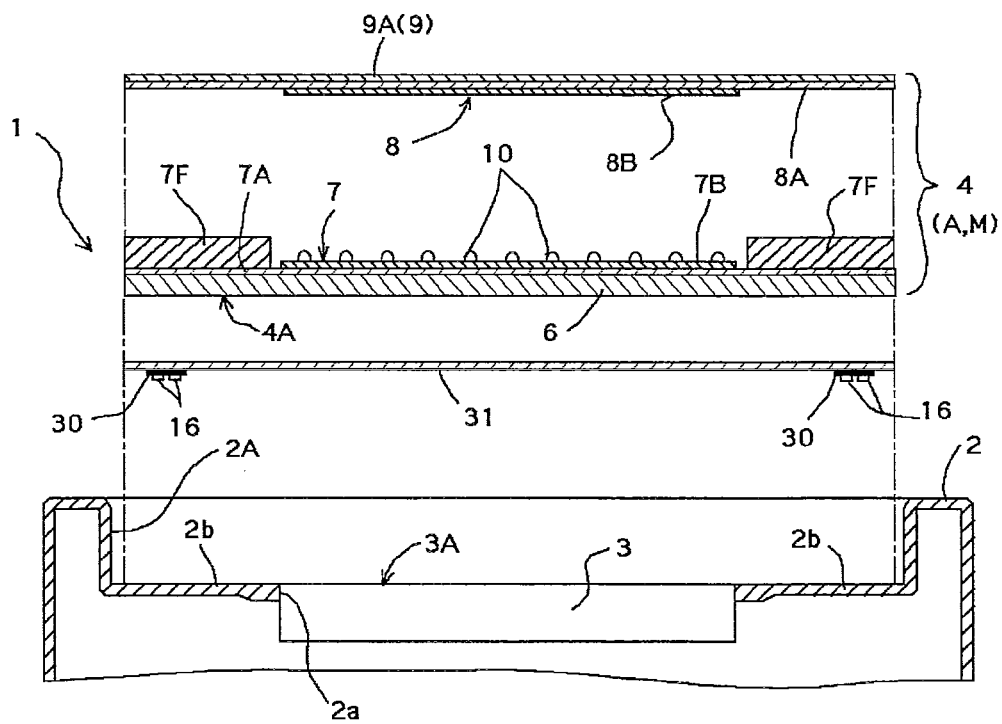
FIG. 1 is a transverse cross sectional view showing a relevant portion of one embodiment of an electronic device having a protection panel according to the present invention.
Figure 2:
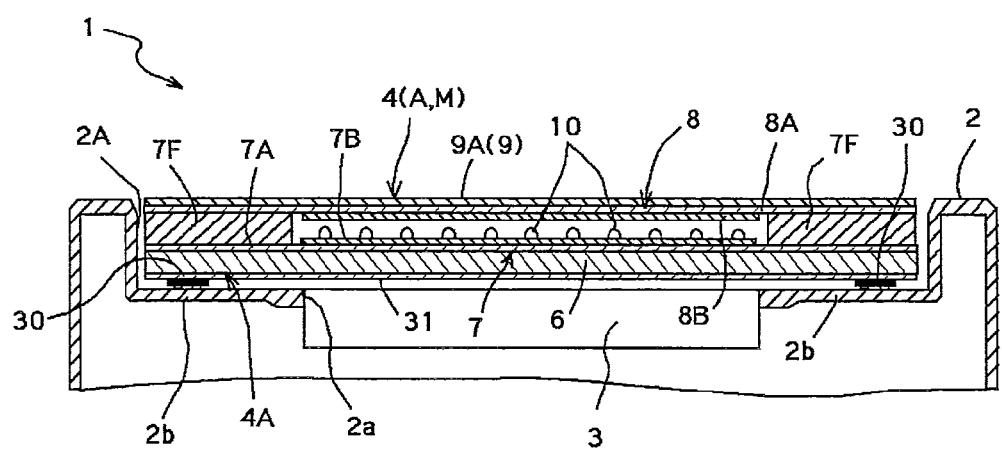
FIG. 2 is an exploded transverse cross sectional view showing a relevant portion of one embodiment of the electronic device having the protection panel according to the present invention.

In the present invention, as shown in FIGS. 1 and 2, the display window 2A of the housing 2 is formed as a recess that has a step which allows the protection panel 4 to be fitted into the recess. A bottom face of the recess is configured to have an opening 2a for allowing the display part 3A of the display device 3 mounted in the housing 2 to face externally, and a supporting portion 2b in a shape of a frame for supporting a back side rim portion 4A of the protection panel 4.

A shape and a size of the display window 2A may vary depending on a shape and a size of the protection panel 4, and a recess depth of the display window 2A may vary depending on a thickness or the like of the protection panel 4. In addition, a shape and a size of the opening 2a of the display window 2A may vary depending on a shape and a size of the display part 3A. Herein, the shapes of the display window 2A, opening 2a, display part 3A, and protection panel 4 are set as rectangle or approximate rectangle. In addition, the recess depth of the display window 2A is set in such a manner that a surface of the housing 2 is in the same plane as a surface of the protection panel 4.

The protection panel 4 may or may not have what is called a touch input function, which is for detecting an X-Y coordinate defined as operation position, based on the touch operation on the protection panel 4. Examples of the touch input function include a resistive film type, a capacitance type, and an electromagnetic induction type. Herein, descriptions will be made with reference to the protection panel having the resistive film type touch input function.

As shown in FIGS. 1 and 2, the protection panel 4 includes: a supporting plate 6 made of resin or glass exhibiting excellent transparency and rigidity; a lower electrode film 7 attached to an upper face of the supporting plate 6; an upper electrode film 8 opposingly arranged above the lower electrode film 7 with a predetermined gap in such a manner that an air layer is formed between the films; a design sheet 9 attached to an upper face of the upper electrode film 8; and the like, so as to function as a touch panel A of resistive film type.

Examples of the resin used in the supporting plate 6 include resins exhibiting excellent transparency and rigidity, such as polycarbonate resin (PC), methacrylic resin (PMMA), acrylonitrile-styrene copolymer resin (AS), acrylonitrile-butadiene-styrene copolymer resin (ABS), cellulose propionate resin (CP), polystyrene resin (PS), polyester resin, and polyethylene resin (PE), and polycarbonate resin (PC) and methacrylic resin (PMMA), which especially exhibit excellent transparency, are preferably used. Examples of the glass used in the supporting plate 6 include soda glass, borosilicate glass, and toughened glass.

Figure 3:
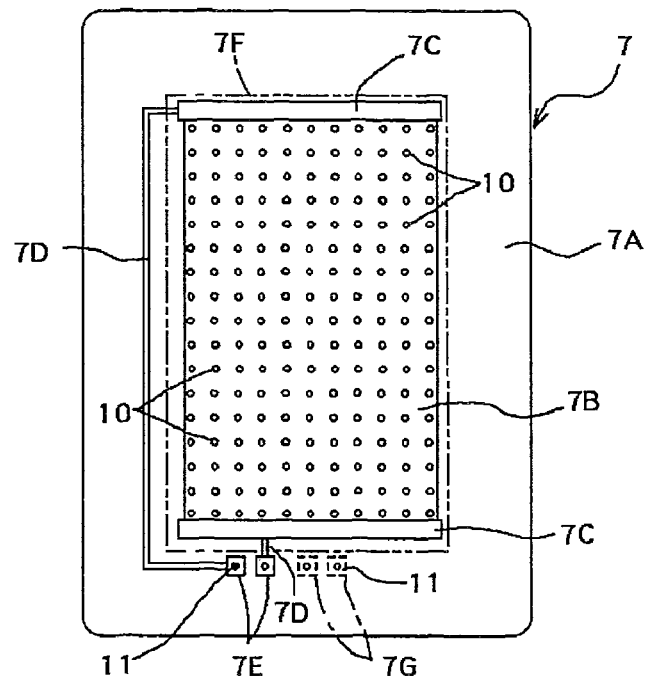
FIG. 3 is a plan view of a lower electrode film according to the present invention.

The thickness of the supporting plate 6 may be selected from a range of 0.5-3.0 mm, and preferably is 1.0 mm As shown in FIGS. 1-3, the lower electrode film 7 includes: a transparent insulation substrate 7A; a rectangular transparent conductive film 7B formed on an upper face of the transparent insulation substrate 7A; a pair of lower bus bars 7C formed on opposing sides of the transparent conductive film 7B and arranged in parallel; a pair of routing circuits 7D and a pair of connecting electrodes 7E formed on a portion in an area surrounding the transparent conductive film 7B; and an adhesion layer 7F in a shape of a frame.

Figure 4:
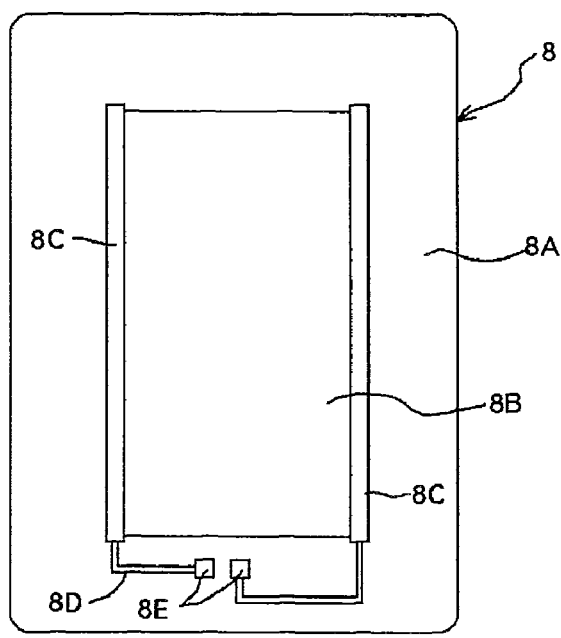
FIG. 4 is a bottom view of an upper electrode film according to the present invention.

As shown in FIGS. 1, 2 and 4, the upper electrode film 8 includes: a flexible transparent insulation substrate 8A that is deflectable when pressed by a finger or the like; a rectangular transparent conductive film 8B formed on a lower face of the flexible transparent insulation substrate 8A; a pair of upper bus bars 8C formed on opposing sides of the transparent conductive film 8B and arranged in parallel; and a pair of routing circuits 8D and a pair of connecting electrodes 8E formed on a portion in an area surrounding the transparent conductive film 8B.

For the transparent insulation substrate 7A of the lower electrode film 7 and the flexible transparent insulation substrate 8A of the upper electrode film 8, there may be used engineering plastics, such as polycarbonates, polyamides, and polyetherketones; or transparent films, such as those made of acrylic, polyethylene terephthalate and polybutylene terephthalate.

Examples of the transparent conductive films 7B,8B of the electrode films 7,8 include a film of metal oxide, such as tin oxide, indium oxide, antimony oxide, zinc oxide, cadmium oxide, indium tin oxide (ITO); composite films mainly composed of these metal oxides; or alternatively, a film of metal, such as gold, silver, copper, tin, nickel, aluminum and palladium. The transparent conductive films 7B, 8B may be formed as a multilayer with two or more layers.

Examples of a method for forming each of the transparent conductive films 7B,8B include vacuum deposition method, sputtering method, ion plating method and CVD method.

As shown in FIGS. 1-3, on one surface of either of the transparent conductive films 7B,8B, a plurality of fine dot-shaped spacer 10 may be formed, in order to prevent erroneous contact between the transparent conductive films 7B,8B when they are arranged opposedly.

Examples of the spacer 10 include: a transparent light curing resin, such as epoxy acrylates and urethane acrylates, and a transparent thermosetting resin, such as polyesters and epoxys. As a fabrication method of the spacer 10, there can be mentioned a printing method, such as screen printing, and photoprocess.

The lower bus bar 7C, the upper bus bar 8C, the routing circuits 7D,8D, and the connecting electrodes 7E,8E may be made of a conductive paste of metal, e.g., gold, silver, copper and nickel, or alternatively, a paste of carbon. Examples of a method for fabricating each of them include printing method, such as screen printing, offset printing, gravure printing, flexogaphic printing; photoresist method; and brush painting method.

The bus bar 7C(8C) is typically formed at a position as close as possible to an edge of the transparent insulation substrate 7A(8A), so as to secure an area with no bus bars 7C(8C) as large as possible at a middle portion of the transparent insulation substrate 7A(8A).

A size and a shape of the area with no bus bars 7C(8C), in other words, an input area or display area, may vary depending on a size and a shape of an input area or display area of the electronic device having the protection panel, such as the mobile-phone 1.

The design sheet 9 includes: a hard coating layer (not shown) on an upper face of a flexible transparent insulation substrate 9A; and a picture layer and an adhesion layer (not shown) on a lower face of the flexible transparent insulation substrate 9A.

Example of the flexible transparent insulation substrate 9A of the design sheet 9 include those made of engineering plastic, such as polycarbonates, polyamides, polyetherketones; and transparent films, such as those made of acrylic, polyethylene terephthalate and polybutylene terephthalate.

A thickness of the flexible transparent insulation substrate 9A may be selected from 50-200 µm, preferably 100-125 µm.

Examples of a material for the hard coating layer of the design sheet 9 include inorganic material, such as siloxane resin, and organic material, such as thermohardening resin containing acrylic epoxy or urethane, and light curing resin containing acrylate. A suitable thickness of the hard coating layer is approximately 1-7 µm.

Examples of a method for fabricating the hard coating layer include coating method, such as roll coating and spray coat, and regular printing method, such as screen printing, offset printing, gravure printing and flexographic printing. The hard coating layer may be directly formed on the upper face of the flexible transparent insulation substrate 9A on whose lower face the picture layer and the adhesion layer are directly formed, or alternatively, the hard coating layer may be formed on a separate flexible transparent insulation substrate different from the flexible transparent insulation substrate 9A on whose lower face the picture layer and the adhesion layer are directly formed, and these flexible transparent insulation substrates may be attached together.

With respect to the design sheet 9, a nonglare treatment may be performed in order to prevent light reflection. For example, an emboss-like pattern may be formed on the flexible transparent insulation substrate 9A or the hard coating layer, or alternatively, fine particles as extender pigment, such as silica and alumina, may be mixed in the hard coating layer.

For the picture layer, a colored ink is preferably used, which includes: polyvinyl resin, polyamide resin, polyester resin, polyacrylic resin, polyurethane resin, polyvinyl acetal resin, polyester urethane resin or alkyd resin as a binder; and pigment or dye of an appropriate color as a coloring agent.

Examples of a method for fabricating the picture layer include regular printing method, such as screen printing, offset printing, gravure printing and flexographic printing. Especially, for polychrome printing and gradation expression, the offset printing and the gravure printing are suitable.

The picture layer may also be a metal film layer, or alternatively, a combination of a picture print layer and a metal film layer. The metal film layer as the image layer is for expressing metallic luster and is formed by vacuum deposition method, sputtering method, ion plating method, plating method or the like. In this case, depending on the desired color of metallic luster, a metal may be selected from, for example, aluminum, nickel, gold, platinum, ferrochrome, copper, tin, indium, silver, titanium, lead and zinc, and alloys or compounds thereof. Typically, a thickness of the metal film layer is approximately 0.05 µm. Moreover, upon forming the metal film layer, a front anchor layer or a rear anchor layer may be provided for the purpose of enhancing adhesiveness with other layers.

For the adhesion layer, a thermosensitive or pressure-sensitive resin suitable for applying to the flexible transparent insulation substrate 8A of the upper electrode film 8 and the flexible transparent insulation substrate 9A of the design sheet 9 is appropriately selected. For example, when the flexible transparent insulation substrates 8A,9A are made of polycarbonates or polyamides, the adhesion layer may be made of polyacrylic resin, polystyrene resin, polyamide resin or the like. When the flexible transparent insulation substrates 8A,9A are made of acrylic or polyethylene terephthalate, the adhesion layer may be made of vinyl chloride, vinyl acetate, acrylic copolymer or the like.

Examples of a method for fabricating the adhesion layer include regular printing method, such as screen printing, offset printing, gravure printing and flexographic printing.

Hereinafter, with reference to FIGS. 1-5, a configuration of the protection panel 4 with a resistive film type touch input function illustrated in the present embodiment will be described in detail.

First, to one side of the rolled-up flexible transparent insulation substrate 8A of a polyethylene terephthalate film (hereinafter, simply referred to as "PET film") having a thickness of 75 µm, ultraviolet curing hard coating containing acrylic is applied using a roll coater, to thereby obtain a PET film with hard coating on one side. Then, on the surface with hard coating, an indium tin oxide film (hereinafter, simply referred to as "ITO film") is formed by sputtering. Next, the PET film is cut into a sheet so as to have a predetermined 2-dimensional size, and then etching resist in a pattern is applied onto the ITO film by screen printing, and unnecessary portions of the ITO film are removed by sulfuric acid to thereby form the rectangular transparent conductive film 8B. After the etching, the resist is removed by alkali washing, and on opposing sides of the transparent conductive film 8B are formed a pair of the upper bus bars 8C arranged in parallel, and on a portion in an area surrounding the transparent conductive film 8B are formed a pair of the routing circuits 8D and a pair of the connecting electrodes 8E, by screen printing using a silver paste. In this manner, the upper electrode film 8 can be fabricated.

Next, to both sides of the rolled-up flexible transparent insulation substrate 9A formed of a PET film having a thickness of 125 µm, ultraviolet curing hard coating containing acrylic is applied using a roll coater, to thereby obtain a PET film with hard coating on both sides. Then, the PET film is cut into a sheet so as to have the same 2-dimensional size as that of the upper electrode film 8, and on one side thereof, there are formed by gravure printing the picture layer and the adhesion layer made of a transparent adhesive mainly composed of acrylic acid ester. In this manner, the design sheet 9 can be obtained.

Then, the whole surfaces of the obtained upper electrode film 8 and design sheet 9 are attached together in such a manner that a face with no ITO film (front face) of the upper electrode film 8 is opposed to a face with the picture layer of the design sheet 9 through the adhesion layer of the design sheet 9.

On the other hand, to both sides of the rolled-up transparent insulation substrate 7A of a polycarbonate film (hereinafter, simply referred to as "PC film") having a thickness of 100 µm, ultraviolet curing hard coating containing acrylic is applied using a roll coater, to thereby obtain a PC film with hard coating on both sides. On one side thereof, an ITO film is formed by sputtering. Then, the PC film is cut into a sheet so as to have the same 2-dimensional size as that of the upper electrode film 8, and then etching resist in a pattern is applied onto the ITO film by screen printing, and unnecessary portions of the ITO film are removed by sulfuric acid to thereby form the rectangular transparent conductive film 7B. Next, on the entire surface of the transparent conductive film 7B, a plurality of the fine dot-shaped spacers 10 are formed by screen printing using an epoxy acrylate-containing thermosetting resin. In addition, on opposing sides of the transparent conductive film 7B are formed a pair of the lower bus bars 7C arranged in parallel, and on a portion in an area surrounding the transparent conductive film 7B are formed a pair of the routing circuits 7D and a pair of the connecting electrodes 7E, by screen printing using a silver paste. Then, onto a pair of the connecting electrodes 7E and two connecting portions 7G corresponding to the connecting electrodes 8E of the upper electrode film 8, an adhesive containing nickel-plated resin beads dispersed therein is applied using screen printing. Further, onto a rim area excluding those electrodes 7E and portions 70, an adhesive ink mainly composed of acrylic acid ester is applied using screen printing, to thereby form the adhesion layer 7F in a shape of a frame. In this manner, the lower electrode film 7 can be fabricated.

Then, the whole face of the lower electrode film 7 on a side with no ITO film is attached together with a polycarbonate plate having a thickness of 1.0 mm as the supporting plate 6, using an adhesive mainly composed of acrylic acid ester. In a portion of one side of the rim area, four through-holes 11 are formed using a drill in such a manner that the holes are aligned along the side. Each of the four through-holes 11 has a diameter of 1 mm, is formed in parallel with a thickness direction of the supporting plate 6 and the lower electrode film 7, and penetrates the connecting electrode 7E or the connecting portion 7G. Each of the through-holes 11 is filled with a silver paste as conductive agent using a dispenser.

Afterward, the lower electrode film 7 laminated with the supporting plate 6 is attached to the upper electrode film 8 laminated with the design sheet 9 through the adhesion layer 7F of the lower electrode film 7, in such a manner that the transparent conductive films 7B,8B are opposed to each other through an air layer, the lower bus bar 7C and the upper bus bar 8C are arranged orthogonal to each other, and the connecting electrode 8E of the upper electrode film 8 is aligned with the corresponding through-hole 11.

Next, a polyimide film whose one side has a copper foil circuit formed thereon is used for fabricating a flexible print circuit (hereinafter, simply referred to as "FPC"), holes are formed in an end electrode portion of the FPC, the hole is aligned with the corresponding through-hole 11 of the supporting plate 6, and a metal pin 12 is inserted into the hole by ultrasonic press-fitting device. As a result, a cable 13 for leading out a touch input signal is provided on a face of the supporting plate 6 to which the lower electrode film is not attached.

In this manner, the protection panel 4 having the resistive film type touch input function can be obtained.

The feature of the present invention lies in that, as shown in FIGS. 1, 2, 5 and 6, the back side rim portion 4A of the protection panel 4, in other words, the rim portion of the face of the supporting plate 6 to which the lower electrode film is not attached, is provided with, instead of the conventional pressure-sensitive conductive rubber, a pressure-sensitive conductive print layer 30 including a resin having a glass-transition temperature (Tg) in a temperature range higher than room temperature as binder, and a conductive material dispersed therein.

The pressure-sensitive conductive print layer 30 is disposed between the supporting portion 2b of the display window 2A and the back side rim portion 4A of the protection panel 4 when the protection panel 4 is fitted into the display window 2A of the housing 2. With this configuration, a pressing operation on the protection panel 4 can be detected (Z coordinate can be sensed).

Figure 6:
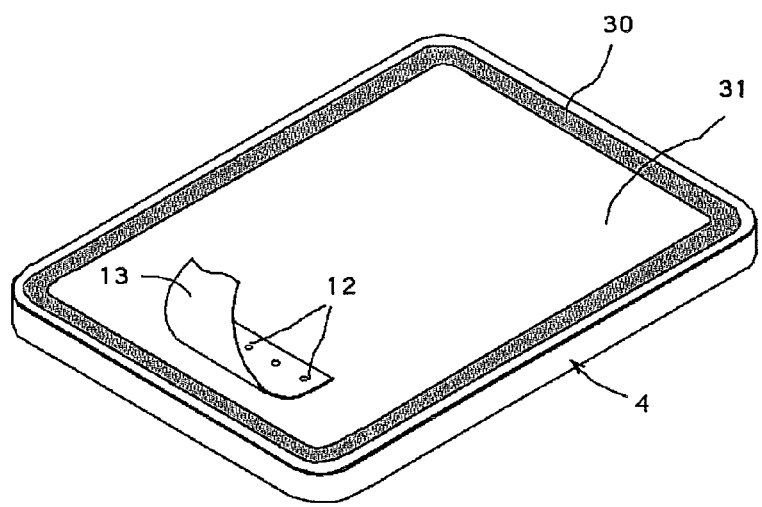
FIG. 6 is a perspective view showing one example of an arrangement pattern of a pressure-sensitive conductive print layer on the protection panel according to the present invention.

In addition, as shown in FIG. 6, in the case of the pressure-sensitive conductive print layer 30 in a shape of a loop with a width of 0.2-20 mm along the supporting portion 2b, when a pressing operation is performed on the protection panel 4, a pressure on the protection panel 4 is applied to the pressure-sensitive conductive print layer 30 regardless of the position of the pressing operation, and the pressure-sensitive conductive print layer 30 becomes conductive. Therefore, the pressing operation on the protection panel 4 becomes stable and can be reliably detected.

The pressure-sensitive conductive print layer 30 is an analogue type whose resistance varies depending on a magnitude of the pressing force.

For the conductive material, there may be used one or more metals, other conductive or semiconductive element and oxide, or alternatively, conductive or semiconductive organic or inorganic polymer. Specifically, examples include one or more of titanium, tantalum, zirconium, vanadium, niobium, hafnium, aluminum, silicon, tin, chromium, molybdenum, tungsten, lead, manganese, beryllium, iron, cobalt, nickel, platinum, palladium, osmium, iridium, rhenium, technetium, rhodium, ruthenium, gold, silver, cadmium, copper, zinc, germanium, arsenic, antimony, bismuth, boron, scandium, metal from lanthanide series and actinide series, and if suitable, at least one conductive agent. A conductive filler can be used as a fundamental component in a nonoxidative state. In addition, the conductive material may be in a form of power, grain or fiber. The conductive material is preferably in a shape of a sphere with a diameter of 0.04-0.2 µm. It should be noted that a dispersion amount can be appropriately adjusted in accordance with the pressure sensitivity.

For the binder made of a resin having a glass-transition temperature (Tg) in a temperature range higher than room temperature, a vinyl chloride-vinyl acetate copolymer resin can be used. Alternatively, an acrylic resin, a polyurethane resin, a polyester resin, an epoxy resin, or chlorinated polyolefin may be used as the binder. Further, nitrocellulose resin, ethylcellulose resin, polyamide resin, or light curing resin may be used as the binder. Other resin materials commonly used as a binder for printing ink may also be used. It should be noted that, the glass-transition temperatures (Tg) of various rubbers are in a temperature range below zero, such as −10 to −55° C. for nitrile rubber (NBR), −57° C. for styrene butadiene rubber (SBR), and −73° C. for natural rubber (NR).

The pressure-sensitive conductive print layer 30 may be directly formed on the back side rim portion 4A of the protection panel 4 by using, for example, screen printing, roll coating, dispenser method or the like. However, as shown in FIGS. 1 and 2, from the viewpoint of selecting a printing method suitable for mass production, such as roll-to-roll processing (R to R), it is more preferable that the pressure-sensitive conductive print layer 30 is formed on a transparent resin film 31 using a regular printing method, such as screen printing, offset printing, gravure printing, and flexographic printing, and then the transparent resin film 31 having the pressure-sensitive conductive print layer 30 formed thereon is attached to a back side of the protection panel 4. It should be noted that, in the case where the transparent resin film 31 having the pressure-sensitive conductive print layer 30 formed thereon covers the entire face of the back side of the protection panel, the cable 13 of the protection panel 4 is introduced after attaching the film 31 to the panel 4.

For the transparent resin film 31 having the pressure-sensitive conductive print layer 30 formed thereon to be attached to the back side of the protection panel 4, there may be used engineering plastics, such as polycarbonates, polyamides, and polyetherketones; or transparent films, such as those made of acrylic, polyethylene terephthalate and polybutylene terephthalate.

A thickness of the pressure-sensitive conductive print layer 30 is set to 1-200 µm. When the thickness is above 200 µm, the print layer cannot be formed and it becomes difficult to apply the print layer to a product in which thinness is demanded, such as mobile device. When the thickness is below 1 µm, variability may exist in a pressure detecting property of the pressure-sensitive conductive print layer.

Figure 5:
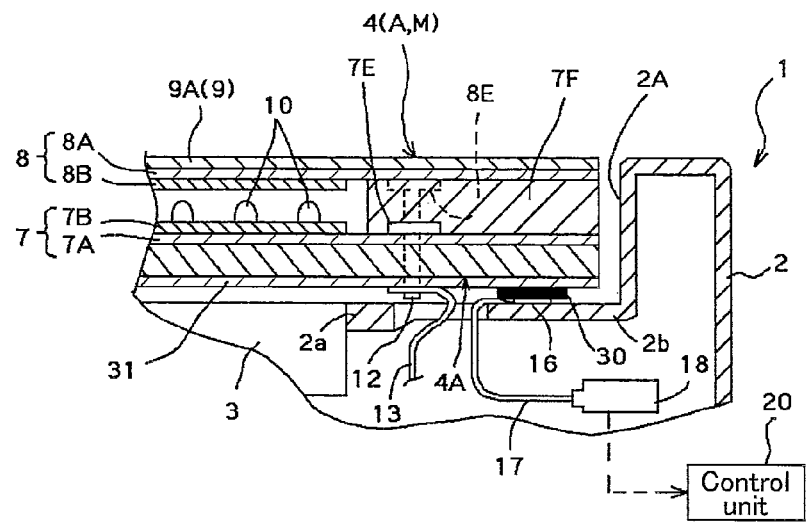
FIG. 5 is a longitudinal sectional side view showing a relevant portion of one embodiment of the electronic device having the protection panel according to the present invention.
Figure 7:
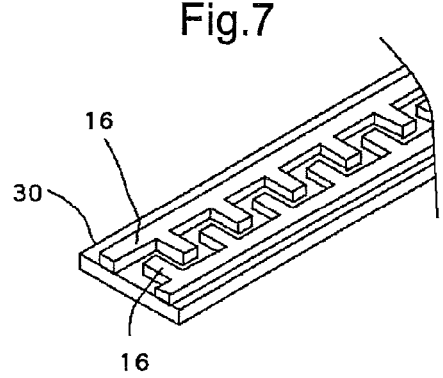
FIG. 7 is a perspective view showing a pattern of a comb-like electrode according to the present invention.

In addition, on one face of the pressure-sensitive conductive print layer 30, a pair of comb-like electrodes 16 as shown in FIG. 7 are disposed, and an end portion of a lead wire 17, such as FPC, extended from each of the electrodes 16 (see FIG. 14) is connected to a connector 18 which is then connected to a control unit 20 mounted in the housing 2 (see FIG. 5). When the input load on the protection panel which is then transmitted through the connector 18 becomes a threshold or more, the control unit 20 determines that the pressing operation on the protection panel was performed. Specifically, the control unit 20 determines that the pressing operation on the protection panel 4 was performed, when a resistance between a pair of the electrodes 16 transmitted through the connector 18 becomes a predetermined threshold or less.

<Evaluation Result>

(1) Sensing Force in Z Axis Direction (Pressure)

A surface of the protection panel 4 with a touch input function having the pressure-sensitive conductive print layer 30 obtained as above was pressed using a polyacetal stylus having a tip of R0.8, and a change in the resistance of the pressure-sensitive conductive print layer 30 was measured.

Figure 8:
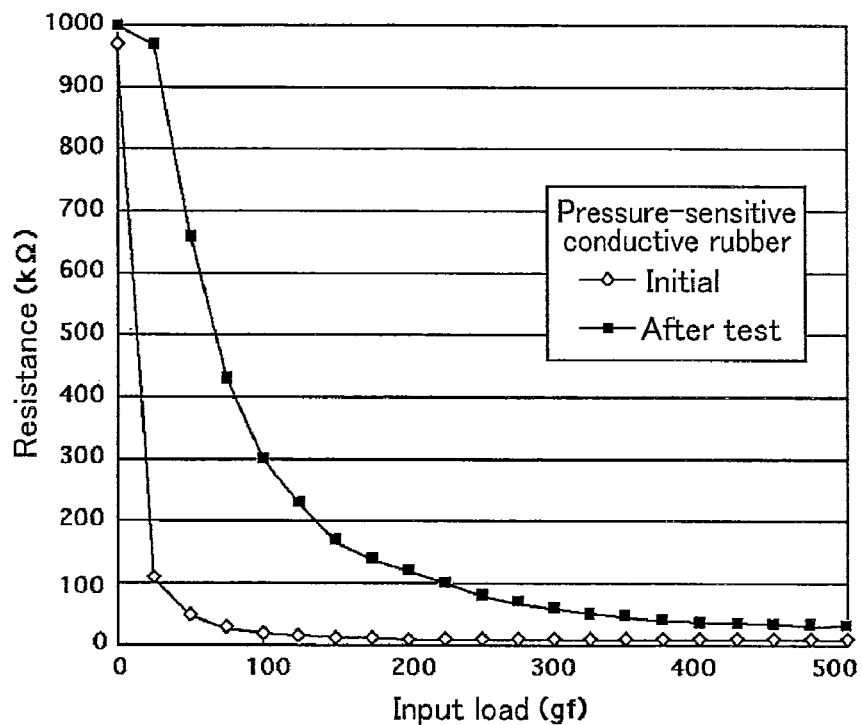
FIG. 8 is a graph showing changes in F-R property of the pressure-sensitive conductive print layer according to the present invention before and after a high-temperature environment test.

As shown in FIG. 8, in this measurement, in accordance with the increase in the pen input load from 0 to 2 N (approximately 200 gf), the resistance of the pressure-sensitive conductive print layer 30 was gradually reduced, and thus it was confirmed that the pen input load can be sensed by means of a change in the resistance.

(2) Durability in a High-Temperature Environment

The protection panel 4 with a touch input function having the pressure-sensitive conductive print layer 30 obtained as above was placed in a high-temperature environment of 85° C. for 16 hours, and then operation of pressure detection was examined.

Figure 9:
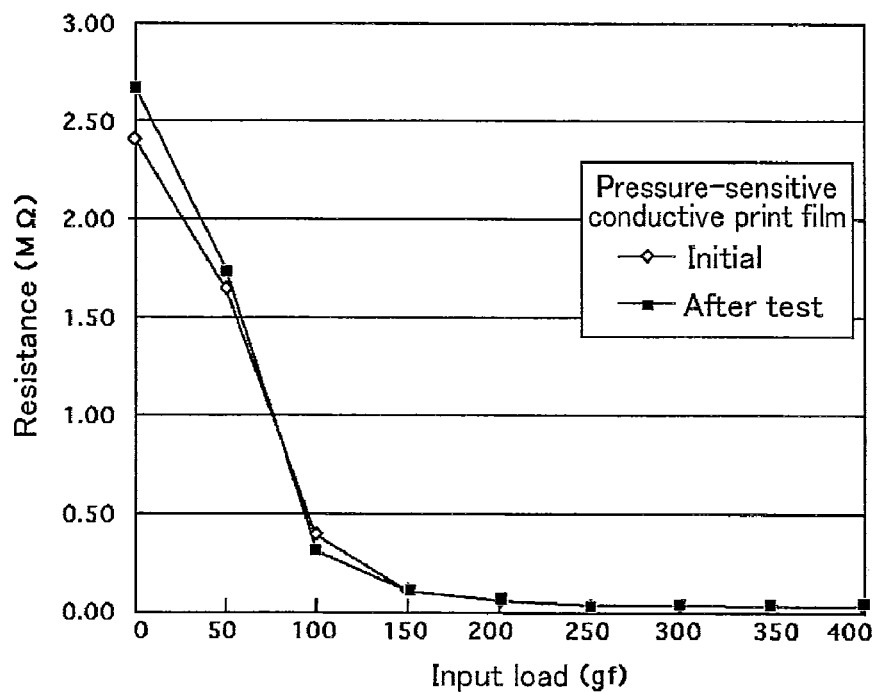
FIG. 9 is a graph showing changes in F-R property of a pressure-sensitive conductive rubber before and after a high-temperature environment test.

As a result, as shown in FIG. 9, placing in a high-temperature environment hardly affected the F-R property. It should be noted that FIG. 8 shows a result of a similar test performed on the pressure-sensitive conductive rubber.

As described above, in the protection panel 4 with a touch input function having the pressure-sensitive conductive print layer 30 as obtained above, it is considered that, due to the presence of the pressure-sensitive conductive print layer 30 on the back side rim portion 4A, when a pressing operation is performed on the surface of the protection panel 4, a pressure on the protection panel 4 is transmitted to the pressure-sensitive conductive print layer 30, the conductive materials dispersed throughout the layer become connected by this pressure, and a conduction is obtained between the electrodes 16 disposed on the pressure-sensitive conductive print layer 30.

It is also considered that, when the protection panel 4 is further pressed, as the deformation of the pressure-sensitive conductive print layer 30 becomes larger, the number of connected conductive materials becomes increased and thus resistance becomes smaller.

To sum up, like the conventional protection panel 104 having a pressure-sensitive conductive rubber 14 between the panel 104 and the supporting portion 2b of the housing 2, this protection panel 4 functions as a variable pressure sensor for detecting a change in the resistance in accordance with a change in the pressing force on the protection panel 4, and can detect a touch operation force and a pen pressure of a stylus. As a result, in the case where the protection panel 4 is applied to the electronic device having, for example, a camera function, it can be used as a zoom switch for altering a zoom speed and a shutter switch for altering a shutter speed depending on a magnitude of the pressing force on the protection panel 4, and in the case where the protection panel 4 is applied to the electronic device having a drawing function, it can be used as a pen pressure recognition sensor for altering light and shade depending on a magnitude of the pressing force on the protection panel 4.

Moreover, when the protection panel 4 was used in a high-temperature environment which causes the problem in the case of the protection panel 104 having the conventional pressure-sensitive conductive rubber, the pressure-sensitive conductive print layer 30 disposed between the protection panel and the supporting portion of the housing did not expand, and as a result, failures did not occur, such as reduction in the sensitivity and poor connection with the electrode.

Figure 10:
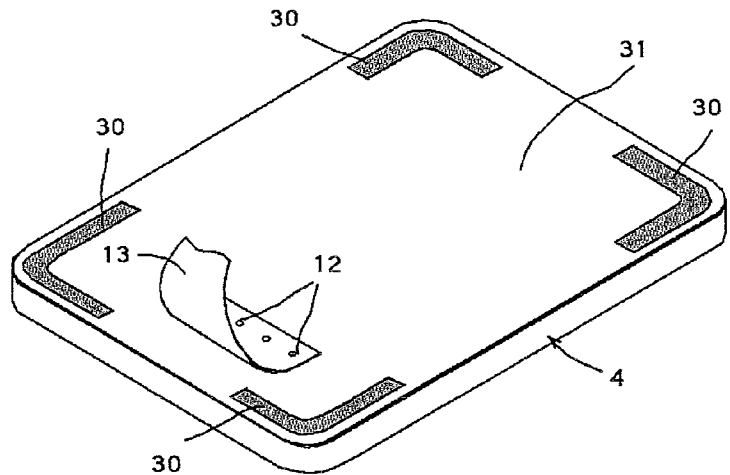
FIG. 10 is a perspective view showing one example of an arrangement pattern of the pressure-sensitive conductive print layer on the protection panel according to the present invention.
Figure 11:
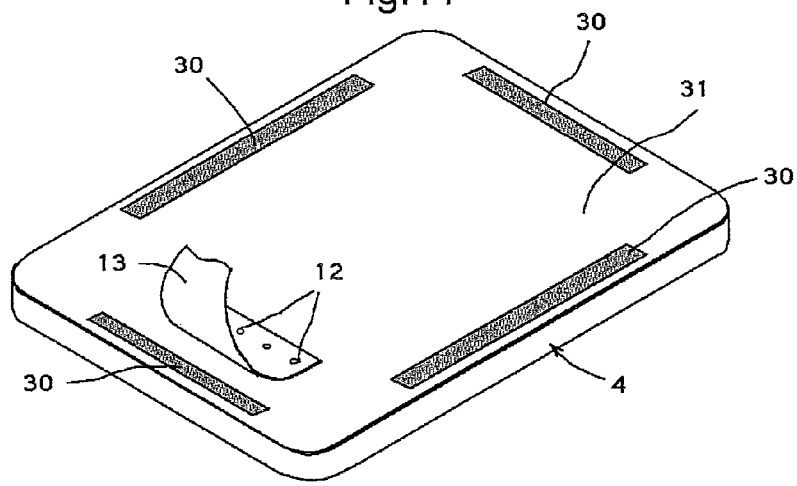
FIG. 11 is a perspective view showing one example of an arrangement pattern of the pressure-sensitive conductive print layer on the protection panel according to the present invention.
Figure 12:
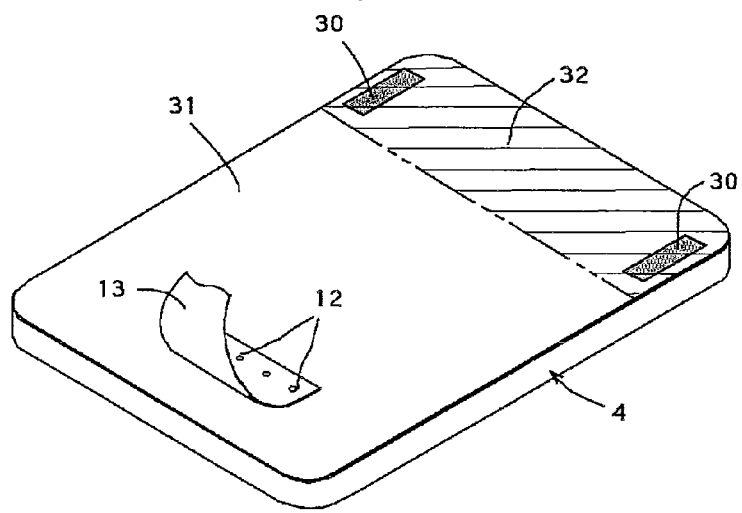
FIG. 12 is a perspective view showing one example of an arrangement pattern of the pressure-sensitive conductive print layer on the protection panel according to the present invention.
Figure 13:
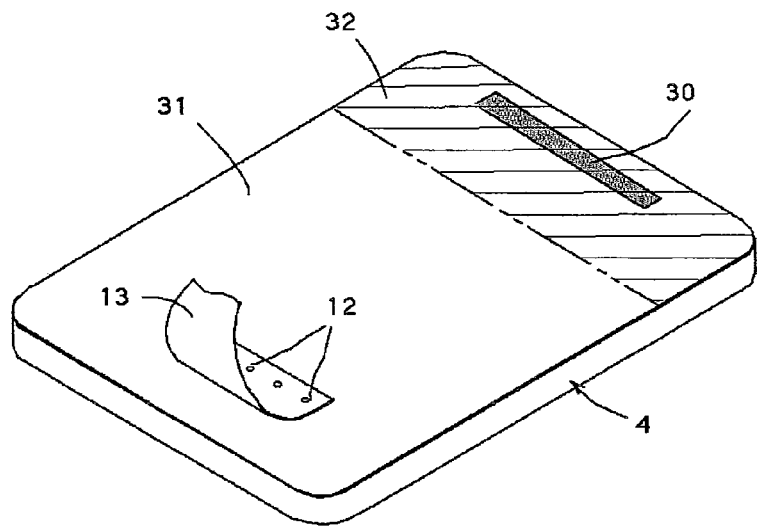
FIG. 13 is a perspective view showing one example of an arrangement pattern of the pressure-sensitive conductive print layer on the protection panel according to the present invention.

OTHER EMBODIMENTS (1) In the first embodiment, the pressure-sensitive conductive print layer 30 is illustrated as those having a shape of a loop along the supporting portion. Alternatively, the pressure-sensitive conductive print layer 30 may be formed in at least one portion of the supporting portion. For example, as shown in FIGS. 10 and 11, in the back side rim portion 4A of the protection panel 4, the pressure-sensitive conductive print layer 30 may be located at four sides or four corners, to thereby provide the protection panel 4 with a function of a cross-shaped switch. In addition, in the case where the pressure sensitive function is required only in a portion of the operation part, e,g., in the case of icon, slider or the like, the pressure-sensitive conductive print layer 30 may be disposed on the back side rim portion 4A of the protection panel 4, only in an area 32 where the pressure sensitive function is required, as shown in FIGS. 12 and 13. It should be noted that a pair of the electrodes 16 are omitted in FIGS. 10-13.

Figure 16:
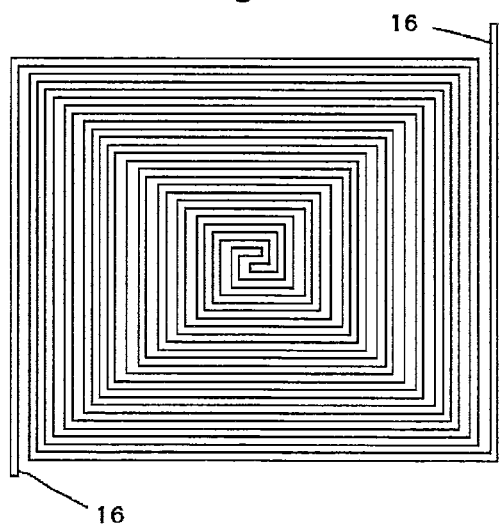
FIG. 16 is a plan view showing a pattern of a spiral electrode according to the present invention.

(2) In the first embodiment, a pair of the electrodes 16 disposed on one face of the pressure-sensitive conductive print layer 30 is illustrated as those having a comb-like shape. Alternatively, instead of the comb-like electrodes, electrodes arranged spirally may be used as shown in FIG. 16. By replacing the comb-like electrodes with the spiral electrodes, the contact area with the pressure-sensitive conductive print layer 30 becomes much larger, and the adjustment of the sensitivity is facilitated.

Figure 14:
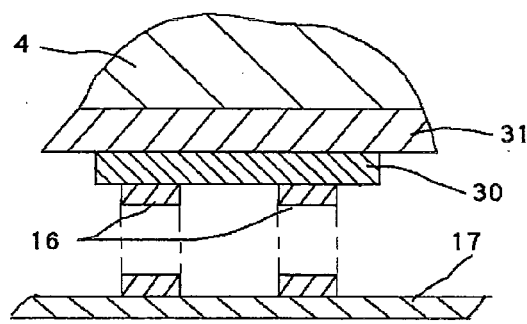
FIG. 14 is a diagram showing one example of how to extend a lead wire from the pressure-sensitive conductive print layer according to the present invention.
Figure 14:
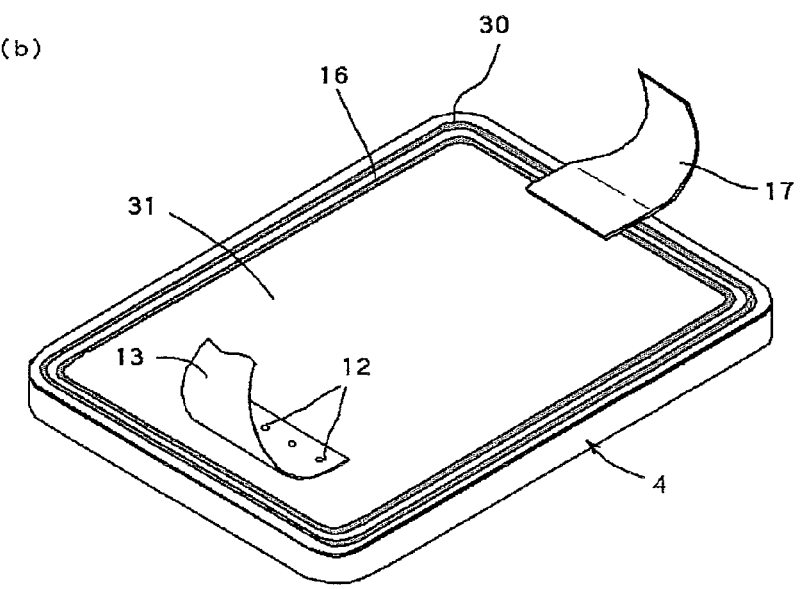
Figure 15:
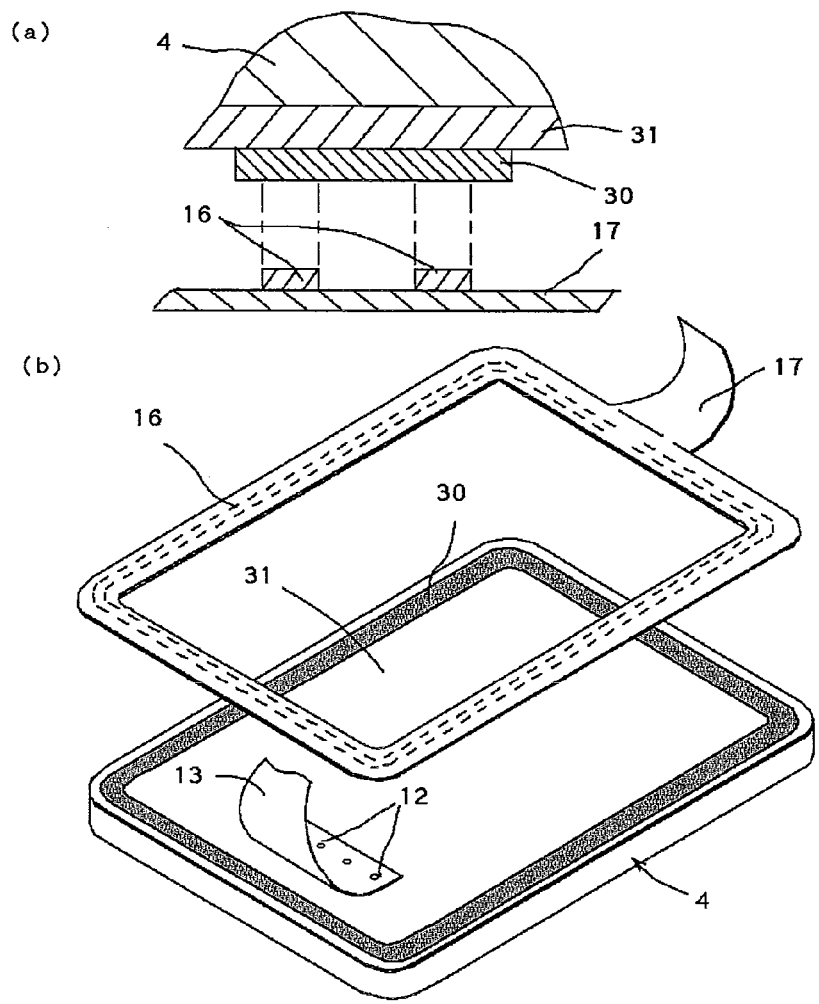
FIG. 15 is a diagram showing one example of how to extend a lead wire from the pressure-sensitive conductive print layer according to the present invention.

(3) As shown in FIG. 15, the lead wire 17 may also serve as a pair of the electrodes 16 (simplified in the drawing) disposed on one face of the pressure-sensitive conductive print layer 30. However in this case, a special lead wire in a shape of a frame is necessary, and thus the embodiment shown in FIG. 14 is preferred. In addition, the lead wire 17 may be integrated with the cable 13 of the protection panel 4.

INDUSTRIAL APPLICABILITY

The electronic device having the protection panel according to the present invention efficiently utilizes the protection panel intrinsically provided in, for example, mobile-phone, smartphone, PDA, car navigation equipment, digital camera, digital video camera, game device, and tablet, and contributes to an increase in the number of functionality and an enhancement of operability of the electronic device, while preventing and suppressing the growth in size and decrease in operability of the electronic device.

The invention claimed is:

1. An electronic device having a protection panel comprising:
   a display device having a display part;
   a housing which is configured to mount the display device therein and have a display window comprising:
      an opening to allow the display part to face externally, and
      a supporting portion in a shape of a frame;
   a protection panel fitted into the display window, whose back side rim portion is supported by the supporting portion; and
   a pressure-sensitive conductive print layer which is disposed between the protection panel and the supporting portion and configured to detect a pressing operation on the protection panel, and comprises:
      a resin having a glass-transition temperature (Tg) in a temperature range higher than room temperature as binder; and
      a conductive material dispersed therein.

2. The electronic device having a protection panel according to claim 1 wherein the pressure-sensitive conductive print layer is a thin film comprising:
   a vinyl chloride-vinyl acetate copolymer resin or acrylic resin as a binder; and
   the conductive material dispersed therein.

3. The electronic device having a protection panel according to claim 1 wherein a transparent resin film having the pressure-sensitive conductive print layer formed thereon is attached to a back side of the protection panel.

4. The electronic device having a protection panel according to claim 1 wherein the pressure-sensitive conductive print layer is formed in a shape of a loop along the supporting portion.

5. The electronic device having a protection panel according to claim 1 wherein the pressure-sensitive conductive print layer is formed in at least one portion of the supporting portion.

6. The electronic device having a protection panel according to claim 1 wherein a pair of comb-like electrodes are disposed on one face of the pressure-sensitive conductive print layer, said pair of comb-like electrodes being configured to detect a pressing operation on the protection panel.

7. The electronic device having a protection panel according to claim 1 wherein a pair of spiral electrodes are disposed on one face of the pressure-sensitive conductive print layer, said pair of spiral electrodes being configured to detect a pressing operation on the protection panel.

8. The electronic device having a protection panel according to claim 1 wherein the protection panel is configured to function as a touch panel.

* * * * *